UNITED STATES PATENT OFFICE.

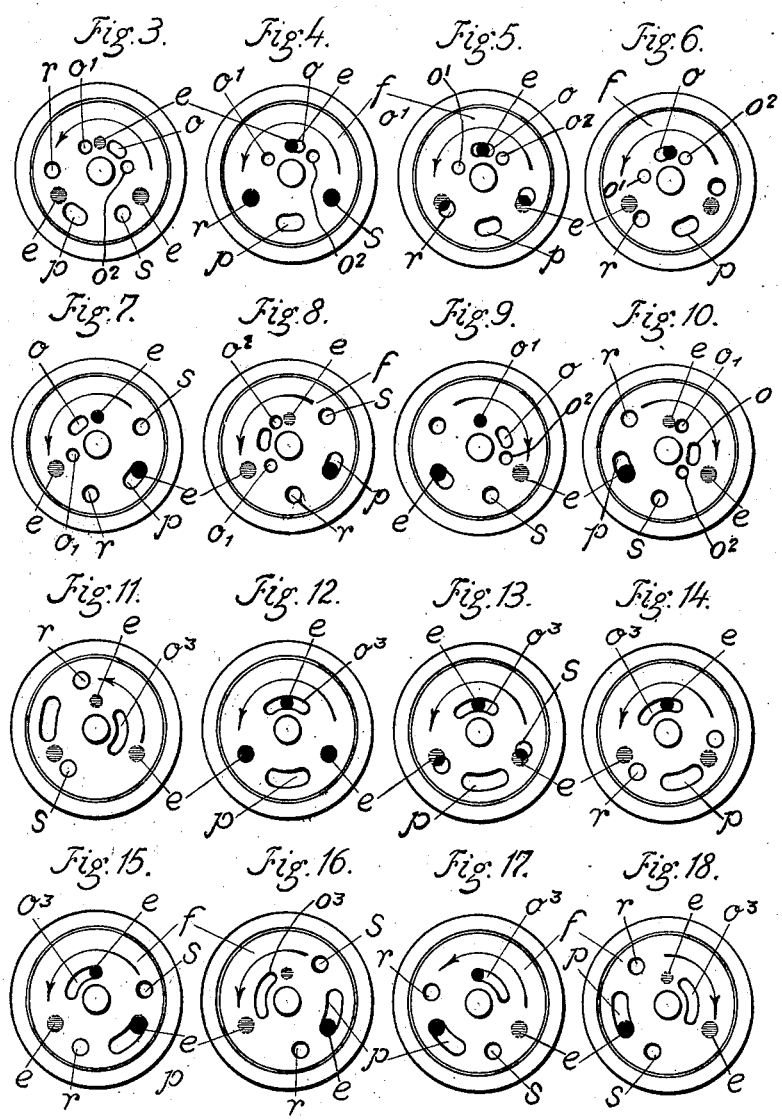

WILHELM SCHORN, OF NEUSS-ON-THE-RHINE, GERMANY.

CONTROLLING-VALVE FOR WATER-CARTS.

1,026,608. Specification of Letters Patent. Patented May 14, 1912.

Application filed August 14, 1911. Serial No. 643,957.

*To all whom it may concern:*

Be it known that I, WILHELM SCHORN, a subject of the German Emperor, residing at 29 Königstrasse, Neuss-on-the-Rhine, Kingdom of Prussia, Germany, have invented certain new and useful Improvements in Controlling-Valves for Water-Carts, of which the following is a specification.

The present invention relates to an arrangement for varying the range of the spray of watering carts having one central sprayer and two side sprayers, by means of a rotary valve operated from the driver's seat, by which valve simultaneously all three passages leading from the valve chest to the sprayers, or each of them or the two side passages simultaneously and uniformly or the central passage together with one or the other side passage may be opened.

The new arrangement is exemplified in the accompanying drawing in two constructional forms.

Figure 1:
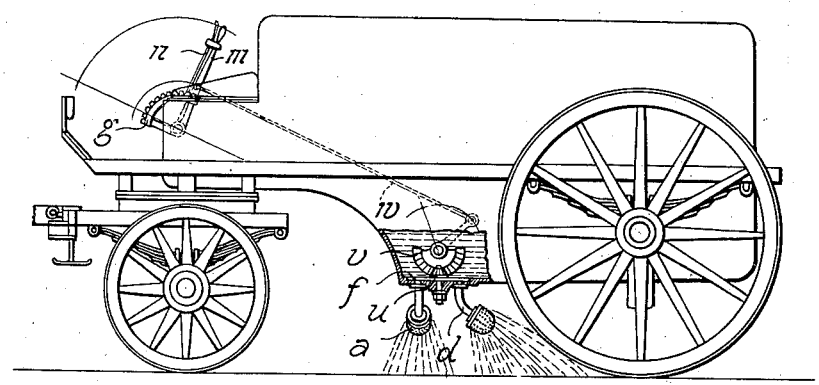
Figure 2:
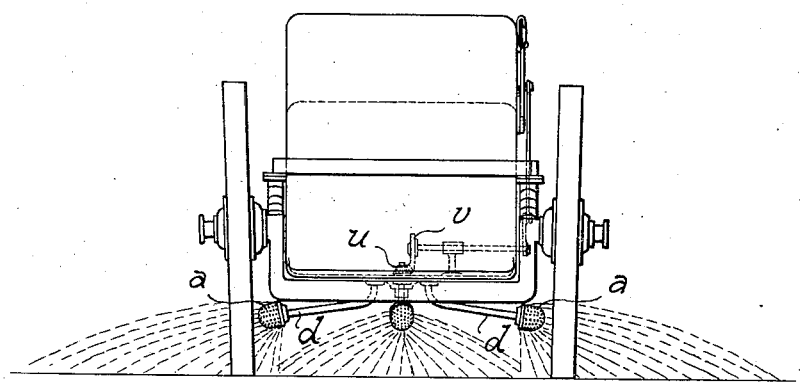

Figures 1 and 2 show the arrangement in combination with a watering cart seen in side view and rear view respectively. Figs. 3-10 show the valve in its various positions. Figs. 11-18 show the second constructional form of the valve in its various positions.

The cart is provided with three sprayers $a$, of which one is arranged in the center and one at each side. Over the mouths $e$ of the passages or pipes $d$ leading from the tank to the sprayers is fitted a rotary disk valve $f$. On the back of this valve is arranged a bevel gear $u$, with which meshes a bevel gear segment $v$. The shaft of this segment extends through the side of the tank and is fitted on the outside with a lever which is coupled by means of a rod $w$ to the steering lever $m$. On the front of this steering lever is provided a pawl $n$, while on the cart is fitted a link segment $g$ having teeth or notches.

The valve according to the constructional form shown in Figs. 3-10 has a circular slot $o$ and two round holes $o^1$, $o^2$ for the central passage, these holes being arranged at the two sides of the central slot and within the extension of the curve of the latter; the valve has besides at a greater distance from its center a slot, $p$, and two round holes $r$, $s$, these being arranged to each other in a manner similar to that in which the openings $o$, $o^1$ and $o^2$ are arranged. At the position of the valve shown in Fig. 3 the three mouths $e$ are closed. By turning the valve in the direction of the arrow into the position according to Fig. 4 all mouths will be opened. When the valve is turned still farther in the same direction the side passages are gradually reduced (Fig. 5) and finally entirely closed (Fig. 6). By such means the full range of the spray on both sides can be gradually reduced to the range of the central sprayer. By turning the valve still farther in the same direction it may be so adjusted that the side passage on the right is opened at the same time with the central one (Fig. 7) or the right side passage alone (Fig. 8). If the left side passage shall be opened at the same time with the central one (Fig. 9) or by itself (Fig. 10) the valve is preferably returned into its initial position and then, as indicated by the arrow, rotated still farther in the same direction.

In the constructional form of the valve according to Figs. 11-18 one single slot $o^3$ is provided for the central passage in place of a slot and two round holes. In Fig. 11 the valve is shown in closed position. By turning the valve in the direction of the arrow by about a quarter turn all mouths $e$ will be opened, Fig. 12. By turning the valve still farther in the same direction the mouths $e$ of the side passages can be gradually reduced, the same as hereinbefore described, Fig. 13, and be completely closed, Fig. 14. On the valve being turned still farther in the same direction, the same as aforesaid, the right side passage may be opened at the same time with the central passage, Fig. 15, or by itself, Fig. 16. By returning the valve into its initial position and before the valve reaches this position, the left side passage will be opened at the same time with the central passage, Fig. 17, and finally by itself, Fig. 18. The two chief positions, all three passages closed and all three passages opened respectively can be alternated by a short turn of the valve to the one or the other side. It is possible to fix the valve in these chief positions and in the intermediate positions hereinbefore described.

I claim:

1. In combination with a watering cart, central and lateral sprayers therefor, and a single valve having ports of different sizes arranged to gradually restrict the flow to said lateral sprayers while maintaining a full flow to the central sprayer, or, cut out either side sprayer and cut in full or restrict the flow to the central sprayer, substantially as described.

2. In combination with a watering cart, central and lateral sprayers therefor, and a single rotary controlling valve having ports of different sizes arranged to gradually restrict the flow to said lateral sprayers while maintaining a full flow to the central sprayer, or, cut out either side sprayer and cut in full or restrict the flow to the central sprayer, substantially as described.

3. In combination with a watering cart, central and lateral sprayers therefor, and a single rotary valve having ports of different sizes all disposed laterally of the axis of rotation of said valve and arranged to gradually restrict the flow to said lateral sprayers while maintaining open a full flow to the central sprayer, or, cut out either side sprayer and cut in full or restrict the flow to the central sprayer, substantially as described.

In testimony whereof I affix my signature in presence of two witnesses.

WILHELM SCHORN. [L. S.]

Witnesses:
ALBERT F. NUFER,
WILHELM SUMNER.

Copies of this patent may be obtained for five cents each, by addressing the "Commissioner of Patents, Washington, D. C."